United States Patent [19]

Longsworth

[11] 4,152,903
[45] May 8, 1979

[54] BIMATERIAL DEMAND FLOW CRYOSTAT

[75] Inventor: Ralph C. Longsworth, Allentown, Pa.

[73] Assignee: Air Products and Chemicals, Inc., Allentown, Pa.

[21] Appl. No.: 896,012

[22] Filed: Apr. 13, 1978

[51] Int. Cl.$^2$ ............................................. F25B 41/04
[52] U.S. Cl. ................................... 62/222; 62/514 JT
[58] Field of Search ............................ 62/222, 514 JT

[56] References Cited

U.S. PATENT DOCUMENTS

| | | | |
|---|---|---|---|
| 3,269,140 | 8/1966 | Peterson et al. | 62/514 JT |
| 3,320,755 | 5/1967 | Jepsen et al. | 62/514 JT |
| 3,413,819 | 12/1968 | Hansen | 62/514 JT |
| 3,457,730 | 7/1969 | Berry et al. | 62/514 JT |
| 3,517,525 | 6/1970 | Campbell | 62/514 JT |
| 3,728,868 | 4/1973 | Longsworth | 62/222 |
| 4,028,907 | 6/1977 | Herrington et al. | 62/222 |

*Primary Examiner*—Ronald C. Capossela

*Attorney, Agent, or Firm*—Thomas G. Ryder; E. Eugene Innis; Barry Moyerman

[57] ABSTRACT

A demand-flow cryostat wherein a refrigerant is supplied through an elongated heat exchanger disposed in a container and the refrigerant is expanded through a Joule-Thompson expansion orifice at one end of the heat exchanger to provide an inventory of liquid in the container at that end and wherein a valve member for controlling a refrigerant flow through the orifice is located adjacent thereto and is movable relative to the orifice; whereby a throttling movement is effected with a reduction in temperature. The operation of the orifice and valve member characterized in that each is affixed to separate mounting means, each of which mounting means is associated with a separate control element composed of different materials whose mean cryogenic linear coefficients of expansion differ by at least about $1 \times 10^{-5}$ (° K$^{-1}$).

16 Claims, 5 Drawing Figures

BIMATERIAL DEMAND FLOW CRYOSTAT

BACKGROUND OF THE INVENTION

My invention relates to cryogenic refrigeration systems generally referred to as cryostats. In particular, my invention relates to demand-flow cryostats wherein the expansion of refrigerant through a Joule-Thompson orifice is controlled in response to inventory of liquefied refrigerant or temperature maintained within the insulated container of the cryostat.

It has previously been suggested in the art of demand-flow cryostats to employ a sensing element at the cold end of the heat exchanger and disposed so as to sense the presence or absence of liquid nitrogen in the container at such cold end and to use this sensing device to control the size of the Joule-Thompson orifice. Illustrative of such devices are those shown in U.S. Pat. Nos. 3,269,140; 3,413,819 and 3,517,525. These devices, however, have the disadvantage of normally operating in an on-off mode due to the fact that the sensing element is in contact with the reservoir of liquefied refrigerant, and that before the sensor will react, it must be warmed to above the temperature of the liquid, i.e. it must no longer be in contact with a reservoir of liquid refrigerant. Thus, the orifice is substantially closed when the sensing element is in contact with the liquid, and the orifice is essentially completely open when the sensing element is not in contact with liquid refrigerant. It has also been suggested in the art to employ sensing devices which extend for substantially the total length of the cryostat. While this approach tends to offset the on-off mode of a sensing element contacting the liquid, these sensing elements tend to detect not only the temperature at the cold end of the cryostat, but also the ambient temperature at the warm end of the cryostat. These devices, being sensitive to changes in ambient temperature, therefore, tend to operate efficiently only over an extremely narrow range of ambient conditions. Such cryostats are of the type described in U.S. Pat. Nos. 3,320,755 and 3,457,730. The shortcomings of these latter type of cryostats have been offset substantially by the type of demand-flow cryostat described in my U.S. Pat. No. 3,728,868 which employs a fluid filled bulb as a sensing and activating means spaced apart from the Joule-Thompson orifice towards the warm end of the heat exchanger. Although various suggestions have been made in the prior art to overcome many of the problems encountered when attempting to design an efficient demand-flow cryostat, there is still a need in the field for an inexpensive and easily fabricated cryostat which is not subject to the shortcomings of an on-off mode of operation and which can provide adequate movement of a valve member out of the Joule-Thompson orifice a sufficient distance to permit the blowout of frozen crystals of impurities in the refrigerant, such as, for example carbon dioxide or water.

SUMMARY OF THE INVENTION

I have devised an improved demand-flow cryostat which, among other things, allows of significant movement of the valve member relative to the orifice and also permits of substantially less expensive fabrication.

Generally, the system to which my improvement relates is a demand-flow cryostat wherein a refrigerant is supplied through an elongated heat exchanger such as, for example, a thin conduit wound in a helix about an elongated mandrel. This heat exchanger is disposed in a container such as a Dewar flask with a Joule-Thompson orifice at the end of the heat exchanger positioned near the bottom of the container. As is well known in this art, refrigerant is passed through the heat exchanger and expanded through the Joule-Thompson orifice so as to produce an inventory of liquid refrigerant in the container at the end of the container near the orifice.

The extreme end of the cryostat beyond the Joule-Thompson orifice is generally the coldest point in the apparatus and is typically referred to as the cold end or cold tip. Conversely, the opposite end of the cryostat, which is usually exposed to ambient conditions, is referred to as the warm end. For convenience, the terms warm and cold are frequently employed to indicate relative position or location of structural members, especially longitudinal members, within a cryostat. Thus, the heat exchanger, such as a finned-tube heat exchanger, will be described as having a cold end and a warm end, although according to some accepted definitions anything "above" the cold end of the extended surface portion of the heat exchanger (e.g., above the finned portion of the tube) is within the warm end. I have taken advantage of this convenient reference in my nomenclature although an effort has been made to distinguish between, for example, the cold tip of the cryostat (i.e. the extreme end of and the coldest point in the cryostat) and the cold end of the heat exchanger (i.e. the end which is relative cooler).

A valve member is also provided for controlling the refrigerant flow through the orifice and such valve member is movable relative to the orifice in a manner so as to effect a throttling movement between orifice and valve with a reduction in temperature. This is effective to control flow of refrigerant through the orifice as a function of temperature.

The particular improvement to which my invention relates comprises the employment of separate mounting means for the orifice and for the valve member. These separate mounting means are disposed so as to permit relative movement between the orifice and the valve member, as well as between the mounting means associated with each. These mounting means are also affixed relative to each other, such as, for example, by being attached to each other or affixed to another relatively immovable member, so as to allow relative movement between each other. Additionally, each of the separate mounting means is provided with a control element which expands and contracts in response to temperature changes. The mounting means cooperates with the associated control element such that expansion and contraction of the control element operates to move the separate mounting means and the orifice or valve member connected to the mounting means. The control elements are composed of two different materials whose mean linear coefficients of expansion in the cryogenic temperature range differ significantly. For purposes of this disclosure, the cryogenic range will encompass the temperatures from approximately room temperature down to the condensation temperature of nitrogen and is defined by the numerical limitations from about 300° K. down to about 77° K. Thus, the term "mean cryogenic linear coefficient of expansion" can be determined by measuring the length of a sample of material at 300° K. and at 77° K., thus providing the change in length over the range. From this information, the mean cryogenic linear coefficient of expansion can be calculated by use of the equation $$\alpha = \Delta L/(L_o \Delta t)$$

wherein $\alpha$ is the coefficient of linear expansion for the cryogenic range, $L_o$ is the initial length of the sample of material, $\Delta L$ is the change in length of the sample, and $\Delta t$ is the change in temperature from initial reading to final reading.

It is a requirement of my invention that the mean cryogenic linear coefficients of expansion of the two materials comprising the control elements differ by at least about $1 \times 10^{-5}$ per °K. (°K.$^{-1}$). Preferably, the difference in mean cryogenic linear coefficients of expansion is at least about $1.5 \times 10^{-5}$ (°K.$^{-1}$) with a difference of at least $2.5 \times 10^{-5}$ (°K.$^{-1}$) being more particularly preferred and a difference of at least about $5 \times 10^{-5}$ (°K.$^{-1}$) being most particularly preferred.

Thus, for example a typical prior art demand flow cryostat employing two different materials as the mounting means for the orifice and valve member is one employing Invar and stainless steel as the two materials, with the valve typically being mounted on the member composed of Invar and the orifice being mounted in stainless steel. In such an apparatus, the difference between mean coefficients of linear expansion is comparatively small since Invar has a mean cryogenic coefficient of linear expansion of approximately $1.36 \times 10^{-6}$ (°K.$^{-1}$) while stainless steel has a mean cryogenic coefficient of linear expansion of about $8.63 \times 10^{-6}$ (°K.$^{-1}$) resulting in a difference of about $7.27 \times 10^{-6}$ or about $0.727 \times 10^{-5}$. While such difference in the coefficients of expansion is adequate to permit temperature control by the relative movement of the valve and orifice, such difference does not permit for adequate relative movement so as to permit the blowout of a frozen crystal of impurity without going through a substantial increase in temperature, e.g. several hundred degrees K., thus requiring heating of the cryostat to a temperature well out of the range desired to be maintained. Additionally, such prior art device necessitates the employment of a comparatively expensive material for fabrication, i.e. Invar. As distinguished from such prior art fabrication, an improved cryostat in accordance with my invention can be composed of a metallic element such as stainless steel, and a plastic element such as polyimide polymer PPMI (Vespel® SP-21) having a mean cryogenic linear coefficient of expansion of about $32.2 \times 10^{-6}$ (°K.$^{-1}$) thereby providing a difference in coefficients of expansion of almost $24 \times 10^{-6}$ or $2.4 \times 10^{-5}$ (°K.$^{-1}$). In fact, a typical embodiment of such improved demand flow cryostat of my invention can be fabricated by having the elongated heat exchanger with the orifice at the cold end thereof mounted on a section of SP-21 functioning as both mounting means and control element. It will be understood, of course, that in other embodiments of the improvement comprising my invention, it is possible for the mounting means and for the control elements each to constitute separate members of the apparatus. It should also be pointed out that it is not a requirement of the improvement of my invention that one of the mounting means and its associated control element or the member which functions as both a mounting means and control element be fabricated from a metal while the other mounting means and/or control element be fabricated from a plastic, but in fact, both the mounting member/control element associated with both the orifice and the valve member can be fabricated from plastics so long as the difference of the mean cryogenic linear coefficients of expansion of the two plastics differ by a sufficient magnitude. On the other hand, however, it is usually necessary that at least one of the control elements be composed of a plastic material.

In various embodiments of the improvement of my invention, it is possible for the mounting means and the control element cooperating or associated with the particular mounting means to be different or the same structural members. In fact, in some embodiments, the mounting means and the control elements for both the orifice and the valve member can each be but single structural members. Conversely, in other embodiments, each of the control elements and each of the mounting means can be separate and distinct structural elements. A particularly convenient embodiment of my invention is one wherein the control element and mounting means for one of the orifice or valve member are comprised of a single structural member while the control element and mounting means for the other of the orifice or valve member comprise separate structural elements.

In establishing the differences in mean cryogenic linear coefficients of expansion of control elements, the employment of the temperature range generally from room temperature down to the condensation temperature of nitrogen, as is mentioned above, is satisfactory to define the coefficients of expansion of the materials. It is preferred, however, that the control elements be composed of materials whose mean linear coefficients of expansion in the range from about 77° K. to about 180° K. also differ by at least about $1 \times 10^{-5}$ (°K.$^{-1}$). It is particularly preferred that the control elements be composed of two different materials whose mean linear coefficients of expansion in the range from about 77° up to about 130° K. differ by at least about $0.5 \times 10^{-5}$ (°K.$^{-1}$).

The following table is provided to illustrate the approximate mean linear coefficients of expansion of various materials over different cryogenic temperature ranges, and so as to indicate materials suitable for employment in the improvement of my invention, as well as to show the variations in coefficients of expansion of prior art materials.

TABLE I

|  | 80–300° K. | 80–180° K. | 80–130° K. |
| --- | --- | --- | --- |
| Invar | $1.36 \times 10^{-6}$ | $1 \times 10^{-6}$ | $<1 \times 10^{-6}$ |
| St. Steel | $8.63 \times 10^{-6}$ | $7 \times 10^{-6}$ | $4 \times 10^{-6}$ |
| PPMI (Vespel SP-21) | $32.2 \times 10^{-6}$ | $24 \times 10^{-6}$ | $18 \times 10^{-6}$ |
| PET (Dacron) | $20 \times 10^{-6}$ | $15 \times 10^{-6}$ | $12 \times 10^{-6}$ |
| ETFE (Tefzel) | $60 \times 10^{-6}$ | $36 \times 10^{-6}$ | $28 \times 10^{-6}$ |
| PC (Lexan) | $50 \times 10^{-6}$ | $30 \times 10^{-6}$ | $18 \times 10^{-6}$ |
| CTFE (Kel-F) | $50 \times 10^{-6}$ | $38 \times 10^{-6}$ | $34 \times 10^{-6}$ |
| TFE (Teflon) | $100 \times 10^{-6}$ | $55 \times 10^{-6}$ | $45 \times 10^{-6}$ |

In the operation of the improvement of my invention, a significant factor is the "effective operable length" of the control elements in any particular embodiment. The term effective operable length can be defined as the dimension of the linear distance over which the structural members connected to the orifice and to the valve member differ in coefficients of expansion. Usually this will be the lengths of their respective control elements. Generally, the effective operable length (e.g., length of control elements) is at least about 0.05 inch and preferably is at least about 0.10 inch. On the other hand, the effective length is generally less than about 1.4 inch and preferably is less than about 0.75 inch.

Within these ranges another correlation exists between effective operable length and the difference in mean cryogenic linear coefficients of expansion of control elements. Typically, this relationship can be expressed as a factor of the effective operable length of the control element having the greater coefficient of linear expansion and the difference of mean cryogenic coefficients of linear expansion between control elements. Thus, if the difference in coefficients is expressed as $\alpha'$ and the datum length of the control element is expressed as $L_o$, then the factor of $\alpha' L_o$, will be at least about $4 \times 10^{-6}$ inch/° K., and preferably will be at least about $9 \times 10^{-6}$ inch/° K. There is no reason for this factor to be greater than about $50 \times 10^{-6}$ inch/° K., and in fact, it can be disadvantageous to have a value of this factor greater than about 75 inch/° K. Preferably, this factor is less than about $25 \times 10^{-6}$ inch/° K. While this expression is not always a completely accurate representation of the operating principles of my improvement, it does provide a reasonable approximation which can serve as a convenient, albeit arbitrary, standard of preferred conditions for practice of the improvement of my invention.

DESCRIPTION OF THE DRAWING

In order to illustrate my invention in greater detail, reference is made to the attached drawing wherein

Referring to FIG. 1, there is shown a cryostat comprising a stainless steel mandrel 10 around which is wound a finned tube heat exchanger 12. At the warm end 14 of the cryostat there is provided an inlet conduit 16 which is connected to a source (not shown) of high pressure working fluid which is normally in the gaseous state. Inlet conduit 16 communicates with one end of inlet chamber 18 containing filter 20, while connecting conduit 22 communicates with the other end of chamber 18 so that working fluid being introduced via inlet conduit 16 passes through filter 20 of chamber 18 and exits from chamber 18 via conduit 22 which is, in turn, connected to finned tube heat exchanger 12. Proximate the cold tip 24 of the cryostat, finned tube heat exchanger 12 terminates in a Joule-Thompson orifice 26 which at this point is mounted on or affixed to stainless steel mandrel 10. Normally, the cryostat is disposed in a glass Dewar (not shown) and, to insure that returning gases expanded through the orifice 26 flow through the fins of heat exchanger 12 wrapped about mandrel 10, thread 28 is helically wound between the succeeding convolutions of heat exchanger 12.

Figure 3:
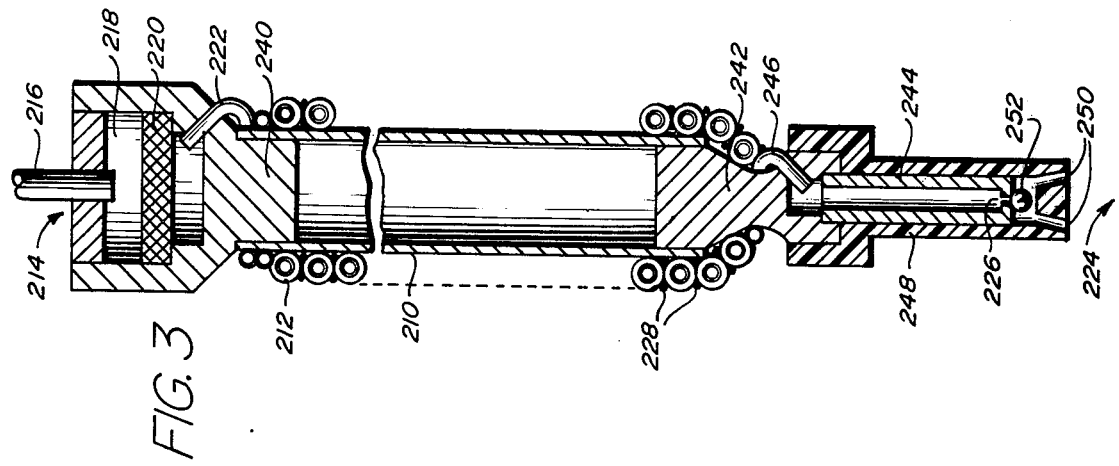
FIGS. 1 through 5 are longitudinal sections through five different embodiments of the improved cryostat of my invention.

Proximate the cold tip 24 of the cryostat, a needle valve 30 is held in plastic block 32 such that the point 34 of valve 30 is adjacent orifice 26 to control the flow of fluid therethrough. As can be seen in the drawing, plastic block 32 is disposed within stainless steel mandrel 10 and extends for some distance from the cold tip 24 of the cryostat toward the warm end 14 of the cryostat. At the end of plastic block 32 removed from the cold end 24 of the cryostat, it is retained in place by means of a threaded member 36; which, in turn, is attached to one end of thin walled member 38. At the warm end 14 of the cryostat the thin walled member 38 and the stainless steel mandrel 10 are rigidly affixed to mounting block 40. Typically, the thin walled member 38 is fabricated from stainless steel as is mandrel 10. Thus, the thin walled member 38 expands and contracts with change in temperature substantially to the same extent as does mandrel 10, and, accordingly, there is substantially no difference in relative linear movement between member 38 and mandrel 10 along the length from the warm end of the cryostat 14 to the point where thin walled member 38 is attached to the plastic block 32 by means of threaded member 36. For the length of plastic block 32 from threaded member 36 to the cold end 24 of the cryostat, there is a substantial relative movement along the length of the cryostat between the plastic block 32 and mandrel 10 due to their differences in coefficients of linear expansion.

In this particular embodiment of my invention, due to the fact that the plastic from which block 32 is fabricated, such as, for example, polyimide polymer (PPMI) or polycarbonate (PC) has a substantially greater linear coefficient of expansion, or mean linear coefficient of expansion in the cryogenic range than does the stainless steel of mandrel 10. The point 34 of needle valve 30 is moved out of and away from orifice 26 as the temperature proximate the cold end 24 of the cryostat increases; thereby permitting a greater quantity of refrigerant fluid to be expanded through the Joule-Thompson orifice 26. This results in a decrease in temperature at the cold end 24 of the cryostat. As the temperature decreases, plastic block 32 contracts at a greater rate and to a greater extent than does the stainless steel mandrel 10 to which the Joule-Thompson orifice 26 is affixed. This causes the point 34 of needle valve 30 to move into orifice 26 with a throttling effect whereby flow of refrigerant fluid through the orifice 26 is reduced.

In this embodiment of my invention it will be noted that the plastic block 32 or control element is located completely above the level of orifice 26, thereby insuring that the control element does not come into contact with any of the normal inventory of liquid refrigerant reservoir contained in the Dewar flask proximate the cold tip 24 of the cryostat. Further, it will be noted that the sensing element, i.e. plastic block 32, extends for a significant distance toward the warm end 14 of the cryostat; thus, in fact, sensing a temperature related to the expanded, returning refrigerant gas, which is believed to be a better or more accurate temperature for control of the cryostat as mentioned in my U.S. Pat. No. 3,728,868.

Figure 2:
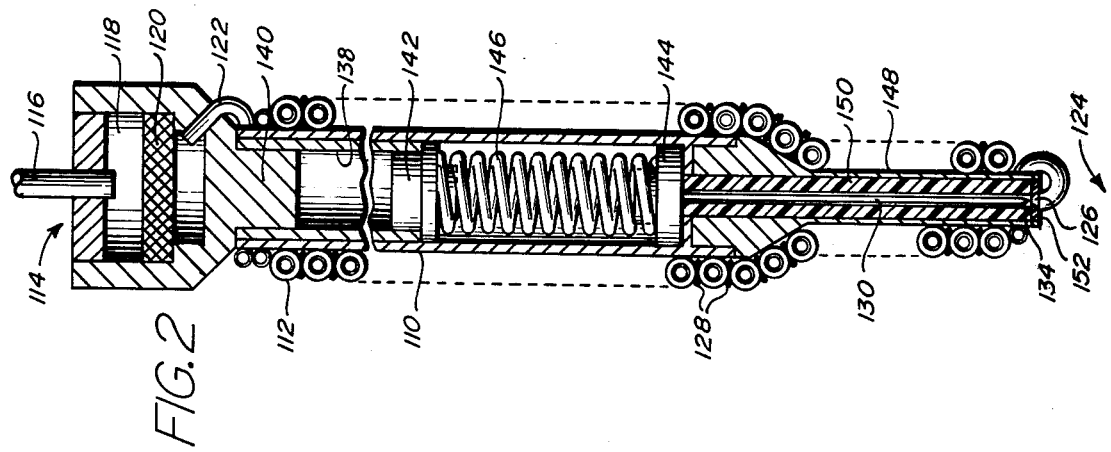
Figure 1:
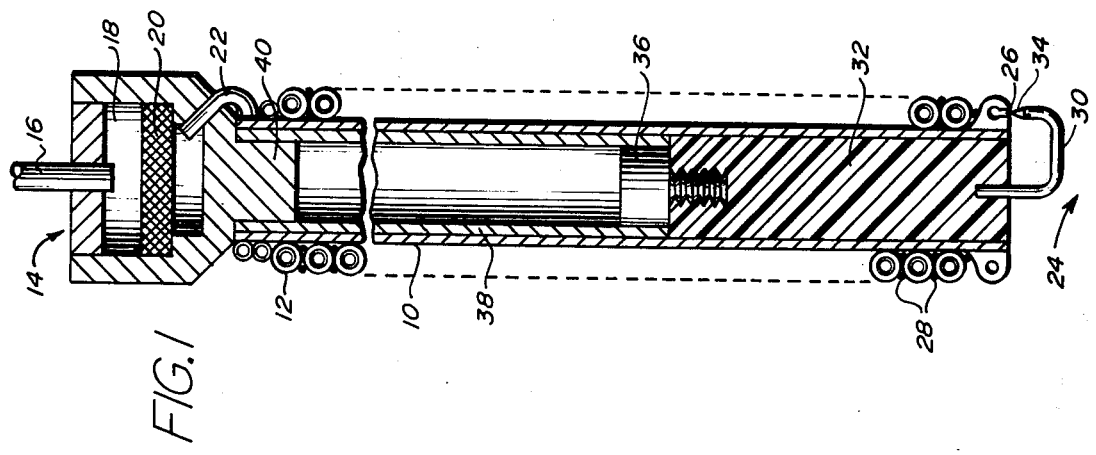

Reference is now made to FIG. 2 of the drawing which illustrates another embodiment of my invention. In this figure, components similar to those described in FIG. 1, are identified by similar numbers. Thus, this cryostat comprises a stainless steel mandrel 110, a finned tube heat exchanger 112 and, at the warm end 114, there is an inlet conduit 116, an inlet chamber 118 containing a filter 120 and connecting conduit 122 providing communication from chamber 118 to finned tube heat exchanger 112. Proximate the cold tip 124 of the cryostat is located Joule-Thompson orifice 126 and needle valve 130 with its point 134 adjacent to orifice 126. The cryostat of this embodiment is also provided with a thread 128 helically wound between the succeeding convolutions of heat exchanger 112. Proximate the warm end 114 of this embodiment of a cryostat, there is located mounting block 140 to which are attached both stainless steel mandrel 110 and thin walled member 138. At the lower end of thin walled member 138, i.e. the end toward the cold tip 124 of the cryostat, and attached thereto is spring retaining member 142. At its upper end, needle valve 130 is provided with a spring retaining head 144. Disposed between spring retaining member 142 and spring retaining head 144 is coil spring 146 maintained in a state of compression thereby biasing needle valve 130 downwardly and urging the point 134 thereof into orifice 126.

Located within mandrel extension 148 is plastic sensing element 150. The lower end of sensing element 150 is disposed so as to bear against shoulders 152 located at the lower end of mandrel extension 148 at the level of orifice 126, while the upper end of plastic sensing element 150 bears against the undersurface of spring retaining head 144 of needle valve 130. Upon an increase in temperature, sensing element 150 expands, further compressing coil spring 146, raising spring retaining head 144 and thereby removing the point 134 of needle valve 130 from the Joule-Thompson orifice 126. This is effective to increase the flow of refrigerant through the orifice thus reducing the temperature proximate the cold tip 124 of the cryostat. Upon a reduction in temperature, sensing element 150 contracts and coil spring 146 bearing against spring retaining head 144 urges needle valve 130 downwardly with the point thereof effecting a throttling action upon Joule-Thompson orifice 126, thus reducing the flow of refrigerant therethrough.

Reference is now made to FIG. 3 of the drawing which illustrates yet another embodiment of my invention. In this figure, components similar to those described in FIGS. 1 and 2 are identified by similar numbers. Thus, this cryostat comprises a mandrel 210, a finned tube heat exchanger 212 and, at the warm end 214, there is an inlet conduit 216, an inlet chamber 218 containing a filter 220 and connecting conduit 222 providing communication from chamber 218 to finned tube heat exchanger 212. As in previously described embodiments, the mandrel 210 is affixed to block 240, and the finned tube heat exchanger 212 is wrapped with thread 228 to insure that expanded gases return through the fin's of the heat exchanger 212.

Proximate the cold tip 224 of the cryostat of this embodiment, there is attached to the lower end of mandrel 210 a common mounting block 242. Affixed to common mounting block 242 is hollow cylindrical stainless steel member 244 which is provided with Joule-Thompson orifice 226 at the end thereof remote from block 242. Cooled, but unexpanded refrigerant from finned tube heat exchanger 212 is passed to the interior of hollow cylindrical member 244 by means of exit conduit 246. Also, sealingly affixed to common mounting block 242 and disposed coaxially about hollow cylindrical member 244 is cylindrical sensing element 248. As can be seen from FIG. 3, the end of sensing element 248 remote from mounting block 242 is closed except for ports 250. Thus, the path of the working fluid in the cryostat proximate the cold end 224 thereof proceeds from finned tube heat exchanger 212 through exit conduit 246, the interior of hollow cylindrical member 244 and is expanded through Joule-Thompson orifice 226 after which the expanded refrigerant or working fluid exits through ports 250 in sensing element 248. Positioned within cylindrical sensing element 248 and disposed proximate Joule-Thompson orifice 226 is ball valve 252. In operation, an increase in temperature causes a greater expansion in clindrical sensing element 248 than in hollow cylindrical member 244 whereby the bottom of sensing element 242 moves away from Joule-Thompson orifice 226 permitting ball valve 252 to be removed from orifice 226 and allowing an increase flow of refrigerant through the expansion orifice 226 thus causing a reduction in temperature. Upon a decrease in temperature, sensing element 248 contracts more rapidly than does hollow cylindrical member 244 and the bottom of sensing element 248 forces ball valve 252 into the orifice 226, thereby effecting throttling of refrigerant flow therethrough. As illustrated in FIG. 3, exit conduit 246 and hollow cylindrical member 244 are actually extensions of heat exchanger 212 terminating at Joule-Thompson orifice 226. Thus, the structural member identified as finned tube heat exchanger 212 can be described as the extended surface portion of the heat exchanger communicating the source of high pressure working fluid with the orifice 226, while the structural members identified as conduit 246 and cylindrical member 244 can be described as the non-extended surface portion of the heat exchanger. This is a structure somewhat different from that illustrated in the other figures wherein the extended surface portion of the heat exchanger terminate substantially at the Joule-Thompson orifice.

Figure 4:
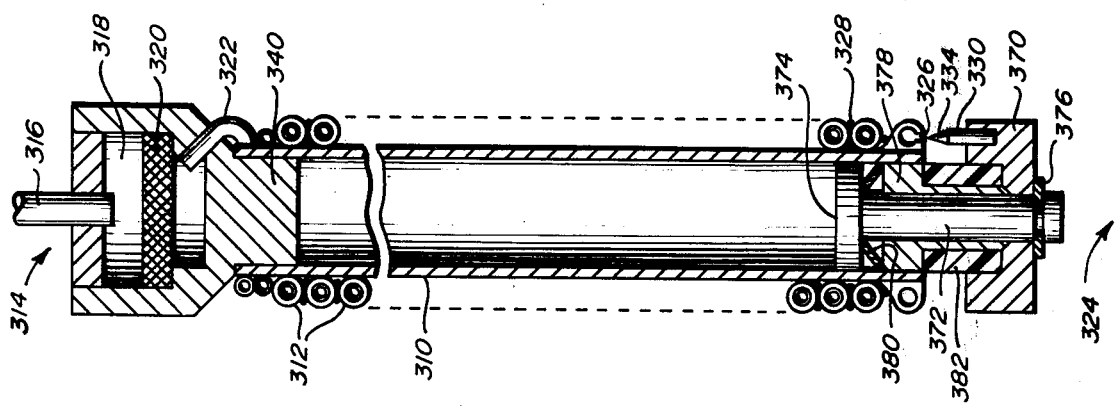

Referring now to FIG. 4, still another embodiment of my invention can be seen. Again, components similar to those described in the preceding figures are identified by similar numbers. Thus, this cryostat is composed of a stainless steel mandrel 310, a finned tube heat exchanger 312 and, at the warm end 314, there is an inlet conduit 316 communicating with inlet chamber 318, which contains filter 320, and connecting conduit 322 providing communication from inlet chamber 318 to finned tube heat exchanger 312. Proximate the cold tip 324, there is located a Joule-Thompson orifice 326 attached to mandrel 310, a thread 28 wrapped about finned tube heat exchanger 312 to direct the flow of expanding gas and a needle valve 330 with its point 334 disposed proximate Joule-Thompson orifice 326. As in previous embodiments, the mandrel 310 is affixed to mounting block 340 proximate the warm end of 314 of the cryostat.

At the cold end 324 of the cryostat it will be seen that needle valve 330 is affixed to valve mounting block 370. An operating rod 372 having an expanded head at its upper end, i.e. toward the warm end 314 of the cryostat, is disposed coaxially relative to mandrel 310 with its upper end and head 374 positioned within mandrel 310. Rod 372 passes through valve mounting block 370 with its lower end extending beyond valve mounting block 370. Also, at the lower end of operating rod 372, a clip ring 376 is affixed about operating rod 372 so as to bear against the lower surface of valve mounting block 370 and prevent downward movement thereof relative to operating rod 372. At the lower end of mandrel 310, i.e. proximate the cold tip 324 of the cryostat, there is located a shoulder member 378 extending radially inward on the interior of mandrel 310 and disposed beneath the expanded head 374 of operating rod 372. Disposed intermediate the upper surface of shoulder member 378 and the lower surface of head 374 is spring member 380 which bears against both the head 374 and the shoulder 378 urging operating rod 372 and valve mounting block 370 upwardly. Disposed between the lower surface of shoulder member 378 and the upper surface of valve mounting block 370 and positioned coaxially about operating rod 372 is hollow cylindrical plastic sensing element 382. The upward biasing of spring member 380 keeps the sensing element 382 in a state of slight compression, such that upon an increase in temperature, sensing element 382 expands between shoulder member 378 and valve mounting block 370 moving block 370 and needle valve 330 downwardly thereby removing the point 334 of the valve from the orifice 326 permitting a greater flow of refrigerant therethrough, thereby effecting a reduction in the temperature. Upon a reduction in temperature, sensing element 382 contracts and through the upward biasing of spring member 380, operating rod 372 moves upwardly carrying valve mounting block 370 and needle valve 330 upwardly, whereby the point 334 of needle valve 330 is moved into orifice 326 effecting a throttling action and a reduction in the flow of refrigerant through the orifice 326.

In the embodiments of my invention illustrated in the other figures of the drawing, it will be noticed that the sensing or control element is positioned intermediate the plane of the orifice and the warm end of the cryostat. In the embodiment of this FIG. 4, however, the control or sensing element 382 is located remote from the warm end 314 relative to the plane of the orifice 326, i.e., intermediate the Joule-Thompson orifice and the cold tip 324 of the cryostat.

Figure 5:
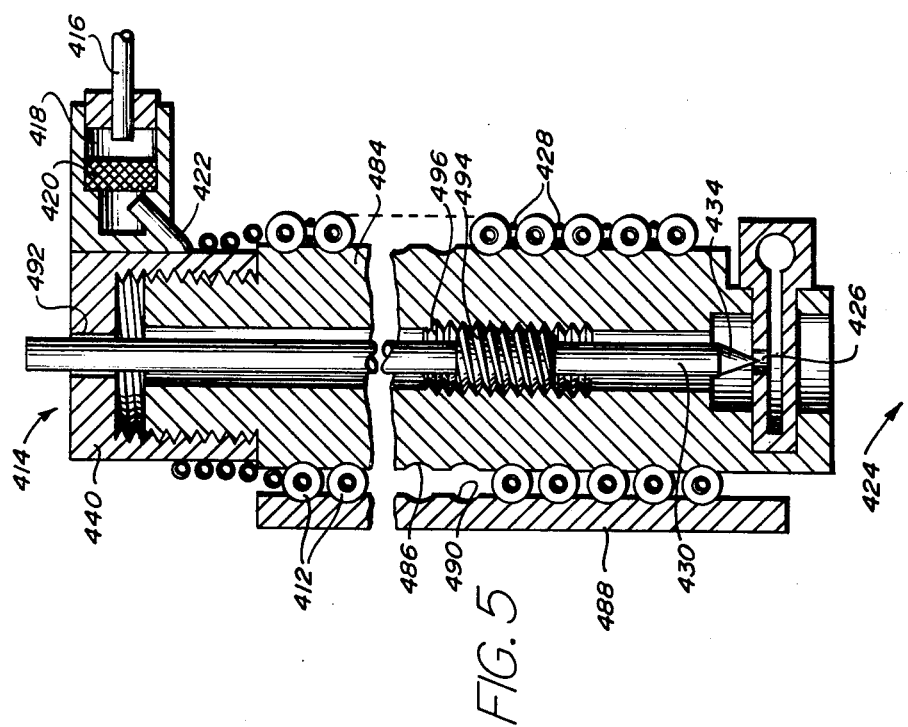

In FIG. 5 of the drawing there is illustrated yet another embodiment of my invention. In this figure, it will be noted that there is a slight variation in the orientation of components at the warm end 414 of the cryostat. Thus, instead of being positioned generally longitudinal with or axially with the cryostat, the inlet conduit 416 and the inlet chamber 418 are disposed transversely to the length or axis of the cryostat. As in the previous embodiments of my invention, a filter 420 is disposed within inlet chamber 418, and the inlet chamber 418 is connected to finned tube heat exchanger 412 by means of connecting conduit 422.

This embodiment of my invention also differs significantly from previously described embodiments in that a hollow cylindrical plastic mandrel 484 is employed instead of the more traditional stainless steel mandrel such as is identified by reference 10 in FIG. 1. As is shown in FIG. 5, plastic mandrel 484 is threaded into mounting block 440 at the warm end 414 of the cryostat. As with previously illustrated embodiments, the finned tube heat exchanger 412 is wrapped about the mandrel 484, but the finned tube heat exchanger 412 is positioned within depressions 486 disposed in the form of a helix in the outer surface of mandrel 484. This configuration eliminates the need for a thread wrapped about the interior of finned tube heat exchanger 412.

In FIG. 5 alternative embodiments are illustrated wherein a thread 428 is shown wrapped exteriorly about finned tube heat exchanger 412 on the right side of the figure to perform the usual function of directing expanded refrigerant through the helical path about finned tube heat exchanger 412. In the other embodiment shown in FIG. 5, a casing member 488 is shown disposed about the exterior of finned tube heat exchanger 412. The casing member is also provided with depressions along its interior wall disposed in the form of a helix and sized to conform with the shape of finned tube heat exchanger 412 such that, in cooperation with the corresponding helical depression in plastic mandrel 484, it operates to direct expanded gases through the fins of finned tube heat exchanger 412. Of course, casing member 488 must be fabricated from the same material as plastic mandrel 484 or of a material having substantially the same linear coefficient of expansion. In assembling a cryostat of this embodiment, the casing member 488 is conveniently threaded over finned tube heat exchanger 412 wrapped about mandrel 484.

Referring now to the cold end 424 of the cryostat, it will be seen that finned tube heat exchanger 412 terminates in a Joule-Thompson orifice 426 mounted on mandrel 484. Positioned within mandrel 484 is needle valve 430 with the point 413 thereof disposed proximate Joule-Thompson orifice 426. As is shown in FIG. 5, needle valve 430 extends through the length of the cryostat and passes through an opening 492 in the top of mounting block 440. Intermediate its ends, needle valve 430 is provided with a threaded portion 494 which is engaged and cooperates with the threaded portion 496 on the interior of mandrel 484. Through the cooperation of threaded portions 494 and 496, needle valve 430 is affixed to mandrel 484 and the positioning of the point 434 relative to Joule-Thompson orifice 426 can be adjusted.

In operation, the critical length for sensing temperature changes is described by the portion of needle valve 430 from its threaded portion 494 to its point 434, and the corresponding portion of mandrel 484 between the point where threaded portion 494 of needle 430 engages the threaded portion 496 of mandrel 484 and the extremity of mandrel 484 proximate the cold tip 424 of the cryostat. Accordingly, as refrigerant or working fluid is expanded through the Joule-Thompson orifice 426 and a reduction in temperature is effected, plastic mandrel 484, specifically the critical length thereof, contracts to a greater extent than needle valve 430, specifically the critical length thereof. This effects relative movement of the point 434 of valve 430 toward and into Joule-Thompson orifice 426 and provides throttling action to reduce the flow of refrigerant through the orifice 426. Conversely, an increase in temperature results in a greater expansion of the critical length of plastic mandrel 484 than the critical length of needle valve 430 thereby removing the point 434 of valve 430 from Joule-Thompson orifice 426 thereby permitting an increased flow of refrigerant.

I claim:

1. In a demand flow cryostat wherein (1) a refrigerant is supplied through an elongated heat exchanger having a warm end and a cold end disposed in a container, (2) the refrigerant is expanded through a Joule-Thompson expansion orifice at the cold end of the heat exchanger to produce an inventory of liquid in the container proximate the cold tip of the cryostat, and (3) a valve member for controlling refrigerant flow through the orifice is disposed adjacent to the orifice and is movable relative to the orifice to effect a throttling movement between the orifice and the valve member with reduction in temperature, whereby flow of refrigerant through the orifice is controlled as a function of the temperature, the improvement which comprises separate mounting means for the orifice and for the valve member disposed and affixed relative to each other so as to provide relative movement therebetween, each of the mounting means operably cooperating with its respective control element and being movable in response to the expansion and contraction of the control elements, and the control elements being composed of different materials whose mean cryogenic linear coefficients of expansion differ by at least about $1 \times 10^{-5}/°$ K.

2. The cryostat of claim 1 wherein the difference between the mean cryogenic linear coefficients of expansion of the control elements is at least about $1.5 \times 10^{-5}/°$ K.

3. The cryostat of claim 1 wherein the mounting means each comprise its cooperating control element.

4. The cryostat of claim 1 wherein the effective operable length is located intermediate the cold tip of the cryostat and the warm end.

5. The cryostat of claim 1 wherein the effective operable length is located intermediate the Joule-Thompson orifice and the warm end.

6. The cryostat of claim 1 wherein the effective operable length is located intermediate the cold end of extended surface portion of the heat exchanger and the cold tip of the cryostat.

7. The cryostat of claim 1 wherein the effective operable length is located intermediate the cold end of extended surface portion of the heat exchanger and the warm end.

8. The cryostat of claim 1 wherein the effective operable length is located intermediate the cold tip of the cryostat and the Joule-Thompson orifice.

9. The cryostat of claim 1 wherein the effective operable length is located intermediate the Joule-Thompson orifice and the cold end of the heat exchanger.

10. The cryostat of claim 1 wherein the coefficient of expansion of the control element cooperating with the mounting means for the valve member is greater than the coefficient of expansion of the control element cooperating with the mounting means for the orifice.

11. The cryostat of claim 1 wherein the coefficient of expansion of the control element cooperating with the mounting means for the valve member is lesser than the coefficient of expansion of the control element cooperating with the mounting means for the orifice.

12. The cryostat of claim 1 wherein the mean cryogenic linear coefficient of expansion differ by at least $2.5 \times 10^{-5}/° K$.

13. The cryostat of claim 1 wherein the mean cryogenic linear coefficient of expansion differ by at least about $5 \times 10^{-5}/° K$.

14. The cryostat of claim 1 wherein the effective length is at least about 0.05 inch.

15. The cryostat of claim 1 wherein the factor $\alpha' L_o$ is at least about $4 \times 10^{-6}$ inch/° K.

16. The cryostat of claim 1 wherein the control element having the greater mean cryogenic linear coefficient of expansion is held in compression.

* * * * *